Aug. 21, 1956 J. J. BEUKEMA ET AL 2,760,000
TWO-WAY CARRIER-WAVE TELEPHONY STATION PROVIDED WITH A COMBINATION CARRIER OSCILLATOR AND AMPLIFIER
Filed Dec. 11, 1951
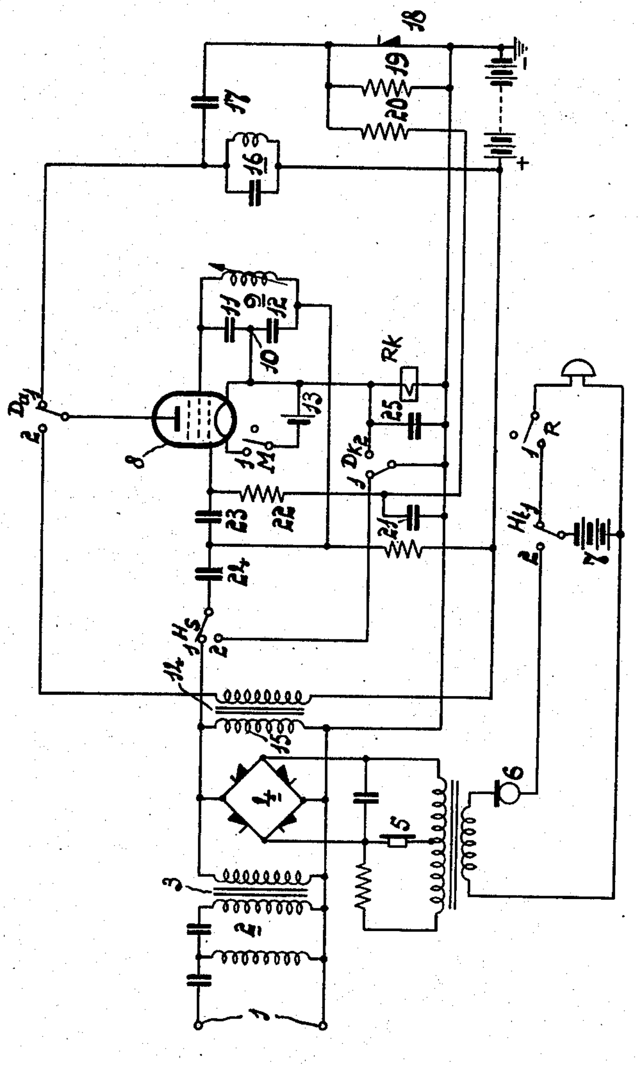
INVENTORS
Jan Jacob Beukema
Jan George Camphuis

United States Patent Office 2,760,000
Patented Aug. 21, 1956

2,760,000

A TWO-WAY CARRIER-WAVE TELEPHONY STATION PROVIDED WITH A COMBINATION CARRIER OSCILLATOR AND AMPLIFIER

Jan Jacob Beukema and Jan George Camphuis, Hilversum, Netherlands, assignors to Hartford National Bank and Trust Company, Hartford, Conn., as trustee Application December 11, 1951, Serial No. 261,106

Claims priority, application Netherlands December 30, 1950

3 Claims. (Cl. 179—1)

This invention relates to a telephone station circuit arrangement for a carrier wave telephone connection between telephone stations, that telephone station which calls another producing the carrier wave required for the transmission.

In a well-known circuit arrangement of this kind the telephone station comprises a discharge tube which acts both as an amplifier and as an oscillator.

In this type of arrangement a press button must be operated for calling and transmitting, and in addition a circuit must be coupled to the anode of the discharge tube via a separate relay.

This known circuit-arrangement requires the use of three relays and three switches having a great number of contacts.

The object of the invention is to provide a simple circuit arrangement for such a telephone station.

In order that the invention may be more clearly understood and readily carried into effect, it will now be described in more detail with reference to the accompanying drawing, in which one embodiment is illustrated by way of example.

The telephone station shown is adapted for official traffic use in an unsupervised amplifier station of a coaxial carrier wave system in order that, for example, during an inspection of the otherwise unsupervised station, it may be possible to effect telephone communication with an additional amplifier station of the system.

For this purpose, an 18 kc./s. channel may be reserved in the frequency spectrum of the system.

Since a 50 kc./s. supply voltage is frequently sent via the cable in a coaxial carrier wave system, it is advantageous to transmit official telephone traffic with the use of carrier wave oscillation, in order to permit ample separation of the telephone traffic and the feed voltage supply.

The transmission line 1 includes a filter 2, a matching transformer 3 and a modulator 4 of known nature, provided with four rectifiers.

The circuit for the modulating or demodulating voltage comprises a four-wire terminating set in which the telephone 5 in the push-pull branch and the microphone 6 are included in known manner.

The microphone circuit comprises, in addition, a battery 7 and the contact 2 of the receiver-rest contact $H_t$ of the telephone station.

Contact 1 of this receiver-rest contact $H_t$ is included in series with the battery 7 in the bell signal circuit, which also contains the contact R of a relay $R_k$.

The energizing winding of relay $R_k$ is integral with the cathode lead of a discharge tube 8.

An oscillatory circuit 9 is connected in known manner between a second grid and a control grid of the tube; the junction point 10 between the capacitors 11 and 12 of the said circuit is connected to the cathode of the tube.

The tube part connected as a Hartley-oscillator will either oscillate or not, in accordance with the mutual conductance to the second grid and hence with the bias voltage of the control grid.

The cathode of the tube is supplied from a battery 13 if the box in which the telephone office is arranged is open.

For this purpose the door or lid of this box is coupled to the switch M which is placed in position 0 when the box is closed and is placed in position 1 when the box is opened. This avoids unnecessary use of the battery.

The anode circuit of the tube includes a change-over contact $D_a$. If contact 2 is closed the anode circuit comprises a transformer 14 of which the secondary 15 is connected to the modulator 4 and via transformer 3 and filter 2 to the transmission line 1.

If contact 1 of the change-over contact $D_a$ is closed the anode circuit is constituted by a circuit 16 which is tuned to the oscillator frequency and of which the end coupled to the anode is connected to a rectifier 18 via a capacitor 17.

Connected in parallel with this rectifier is a resistor 19 and the voltage set up across this resistor is fed to the control grid of tube 8 via a resistor 20, a filtering capacitor 21 and a resistor 22.

The control grid of the tube is capacitatively coupled to change-over contact $H_s$ via capacitors 23 and 24 so that, if contact 1 of this change-over contact is closed, alternating voltages originating from the transmission line 1 are fed to the control grid.

The energizing winding $R_k$ of the relay R, which is shunted by capacitor 25, constitutes together with capacitor 25, a network for producing automatic negative control grid bias voltage for tube 8, and this voltage is supplied to the control grid via the resistors 19, 20 and 22.

Contact 2 of change-over relay $D_k$ is connected in parallel with the said network. If contact 2 is closed the negative bias voltage is not supplied to the control grid.

The change-over contacts $D_a$ and $D_k$ are coupled together so as to close contact 1 or contact 2 simultaneously. The said change-over contacts are both referred to hereinafter as D.

The same remark applies to the change-over contacts $H_t$ and $H_s$, which will be referred to hereinafter as H.

If no negative bias voltage is supplied to the control grid of the tube, the tube will oscillate, if this bias is present at the grid, it has such a value that the tube does not oscillate, but instead functions as an amplifier.

The telephone station described operates as follows, starting from the rest condition shown in the figure.

When the box of the station is opened, contact $M_1$ is closed, so that the filament of the tube is heated.

If the receiver is then lifted the receiver-rest contact H occupies the position 2, in which the microphone circuit is completed and the control grid of the tube is decoupled from the transmission line.

The change-over contact D functioning as a press button is then depressed and will occupy position 2 in which it will be locked. This locking may be effected in known mechanical manner.

The network for producing the automatic control grid voltage is thus short-circuited so that the tube tends to oscillate.

The carrier wave oscillation of, say, 18 kc./s. thus produced is fed to the transmission line 1 via transformer 14.

If voice signals are supplied to the microphone 6, this carrier wave oscillation is modulated by the speech signals fed via the four-wire terminating set to the modulator 4.

On the basis of the rest condition shown on the drawing, it will now be shown how the circuit-arrangement operates if the telephone station is called.

In the present case the telephone station called is also assumed to be of the unsupervised type, so that on receiving a call the station need only be operated when supervisory staff is present in loco for an inspection and the box is open so that the switch M occupies the position 1.

Since the receiver has not yet been lifted, the receiver-rest contact H occupies the position 1 and the press knob D also occupies position 1.

If a carrier wave oscillation of 18 kc./s. comes in via the line 1, it is fed to the control grid of the tube 8. Since negative bias voltage is provided, this tube acts as an amplifier and a voltage is set up across the circuit 16. This voltage is rectified and the rectified voltage increases the potential of the control grid.

Thus, the anode direct current of the tube 8 is increased and the relay $R_k$ is energized so that contact $R_1$ is closed and a bell signal is given.

It should be noted that the tube also tends to oscillate at this time, but this oscillation is terminated both when the supplied carrier wave fails to appear and during the receiver-lifting to be described hereinafter; in the first case by the line damping, which by then is still effective in the control grid circuit; and in the second case because the control grid is grounded for alternating voltage via $H_2$.

If the receiver-rest contact is changed over by lifting the receiver, the microphone circuit is completed and the control grid of the tube is decoupled from the transmission line and is grounded via $H_s$ contact 2 and $D_k$ contact 1.

There is effective at the modulator 4 a carrier wave voltage which is produced by the calling telephone office.

Now, if the microphone is spoken into, this carrier wave oscillation is modulated.

Upon termination of the call the receiver is replaced in both telephone stations so that in the calling station the locking of the press button D is also removed and the latter snaps back into position 1.

It is obvious from the foregoing that the circuit-arrangement according to the invention requires only a very small number of switches and one relay per telephone station, so that the circuit arrangement is simple and very dependable.

What we claim is:

1. A telephone system for establishing carrier-wave communication connections between two telephone stations via a transmission line and wherein each of said stations is capable of calling the other of said stations and wherein said calling station generates the carrier-wave and said other station receives said carrier-wave, each of said stations of said system comprising an electron discharge tube having a cathode, a control grid electrode, an additional grid electrode and an anode, a resonator means coupled to said grid electrodes to form an oscillatory circuit, a network connected to said cathode and interposed in series with the discharge path of said tube, means connecting said control grid to said network whereby the voltage drop in said network produces a negative bias for said control grid with respect to said cathode, a first switching means connected to short-circuit said network only when the station is used for calling thereby to prevent said bias from being effective, first and second output circuits for said tube, said first output circuit being coupled to said transmission line and said second output circuit comprising an impedance and a rectifier coupled together, a second switching means having two switching positions, the first of said switching positions being adapted to couple said first output circuit to said anode when the station is used for calling thereby to cause said oscillatory circuit to generate said carrier-wave and to feed said carrier-wave to said transmission line, and the second of said switching positions being adapted to couple said second output circuit to said anode and to couple said control grid to said transmission line when the station is used for receiving whereby the received signal is amplified by said tube and is developed across said impedance, said rectifier being polarized to develop a positive-polarity voltage from the signal across said impedance, and means connected to apply said positive-polarity voltage to said control grid thereby to increase both the current in said tube and the amount of amplification provided by said tube.

2. A telephone system as claimed in claim 1, including a bell signal circuit and means connected to actuate said signal circuit in response to said increase in the current in said tube.

3. A telephone system as claimed in claim 2, in which said last-named means comprises a relay having a winding connected in said network and having contacts connected in said signal circuit.

References Cited in the file of this patent

UNITED STATES PATENTS

| | | |
|---|---|---|
| 2,288,214 | Summers | June 30, 1942 |
| 2,366,329 | George | Jan. 2, 1945 |
| 2,386,515 | Swart | Oct. 9, 1945 |
| 2,632,812 | Cooney | Mar. 24, 1953 |